United States Patent

[11] 3,582,181

[72] Inventor: Maria Dolores, Manua de Chveca
Rambla de Catalina, 77 2°, 1ª, Barcelona, Spain
[21] Appl. No. 850,723
[22] Filed Aug. 18, 1969
[45] Patented June 1, 1971
[32] Priority May 21, 1969
[33] Spain
[31] 148,729

[54] POCKET MICROSCOPE INCLUDING ILLUMINATING MEANS AND MOVABLE OBJECTIVE
5 Claims, 2 Drawing Figs.

[52] U.S. Cl. ............... 350/87, 350/236, 350/238, 350/239, 350/255
[51] Int. Cl. ............... G02b 21/06
[50] Field of Search ............... 350/87, 236, 238, 239, 255

[56] References Cited
UNITED STATES PATENTS

| | | | |
|---|---|---|---|
| 34,409 | 2/1862 | Craig | 350/238 |
| 42,843 | 5/1864 | Ellis | 350/239 |
| 56,178 | 7/1866 | Chase | 350/239 |
| 2,410,722 | 11/1946 | Eckert | 350/239 |
| 2,427,689 | 9/1947 | Osterberg et al. | 350/87UX |
| 2,533,371 | 12/1950 | Heine | 350/255UX |
| 2,787,937 | 4/1957 | Prisament | 350/238X |
| 2,870,674 | 1/1959 | Mize | 350/238 |
| 3,410,635 | 11/1968 | Lockwood | 350/239 |

Primary Examiner—David Schonberg
Assistant Examiner—Toby H. Kusmer
Attorney—Woodhams, Blanchard & Flynn ABSTRACT: A pocket microscope comprising a housing having first and second tubular elements coaxially press fitted together. An eyepiece is mounted on the first tubular element and an illuminating means is mounted on the second tubular element. The illuminating means includes a lamp and a battery which is normally maintained out of contact with the lamp. A manually movable actuator member is mounted on the housing end cap for causing relative movement of the battery toward the lamp. An objective means is movably mounted within the housing and is selectively movable axially thereof.

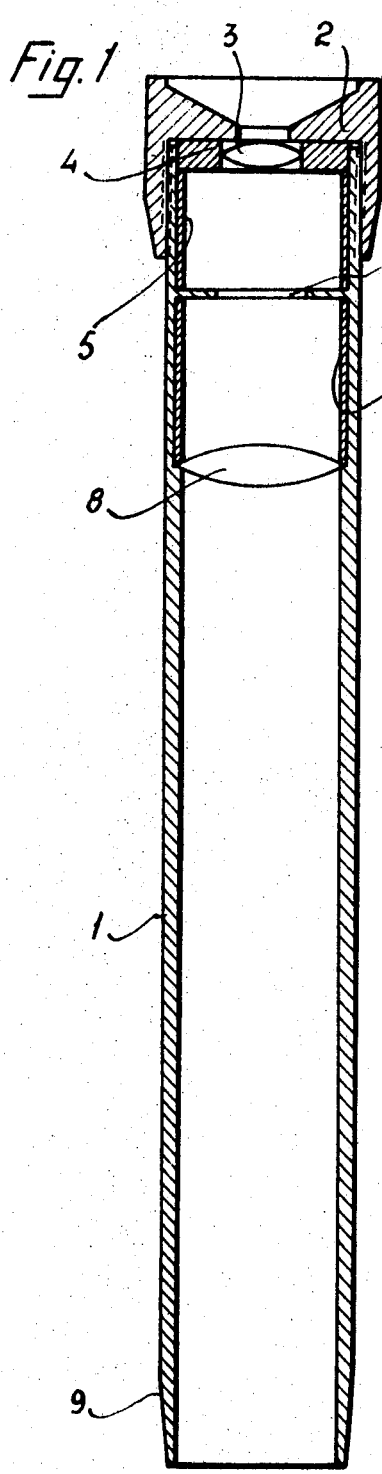
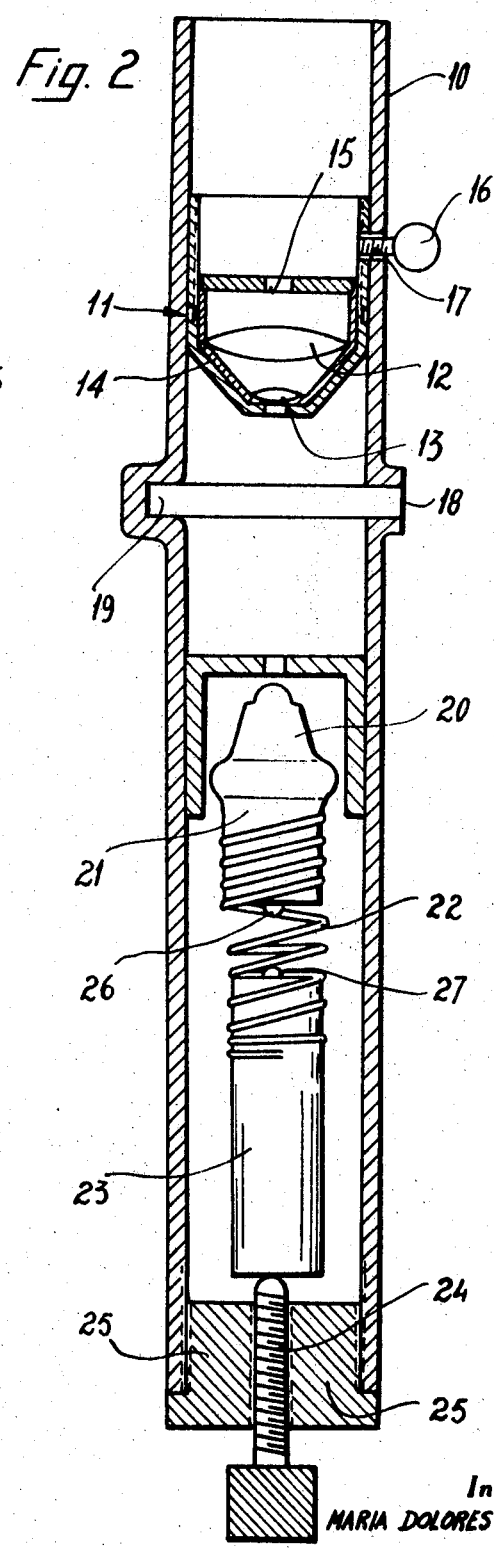

POCKET MICROSCOPE INCLUDING ILLUMINATING MEANS AND MOVABLE OBJECTIVE

This invention refers to a pocket microscope, or more concretely, a compound microscope has been conceived in the invention, integrated by a tubular support mountable by fitting together under pressure its two essential parts, one of which comprises the eyepiece while the other part comprises the object slide, the objective and the source of self-contained light.

The microscope is constituted therefore by a tubular body dividable into two ostensibly similar parts, thus allowing these separated parts to be easily contained in a pocket pouch, case or the like for easy carrying.

The coupling together of both parts is exceedingly simple by insert one within the other under pressure, thus preparing the microscope for service and adequate for realizing examinations.

In order to facilitate this explication, a sheet of drawings is attached hereto illustrating one case of realization of this invention as an example only. In the drawings:

FIG. 1 represents a diametrical section of the upper tube that contains the eyepiece.

FIG. 2 is another cross section similar to FIG. 1 corresponding to the bottom tube that holds the objective, object slide and self-contained light source.

Referring to the figures that are drawn to a very enlarged scale, the tube 1 housing the eyepiece will be seen, whose upper extremity is threaded to receive the sleeve 2 which retains the eyepiece lens 3 held by a ring gasket 4 which is seated on the separating sleeve 5, which in cooperation with the lower separator 6, determines the position of a diaphragm 7 with fixed aperture.

The tube 1 has an interior ledge on which the lens 8 is seated forming part of the eyepiece assembly. The lower end of this tube is conical 9 for its insertion under pressure into the extremity of the coaxial tube 10 which houses the objective 11 with its corresponding lenses 12 and 13 situated in position by the separators 14 and the diaphragm 15. The objective is adjusted by means of a solidly attached knob 16 by sliding same through a helical slot 17.

The object slide is housed in the mouthpiece of a cavity 19 formed by a transverse slot 18 in the tube, the remainder of the tube housing the self-contained luminous source comprising the lamp 20 whose holder 21 is wound with the end turns of a spiral spring 22 and joined by the opposite turns to the dry battery 23 which is moved axially by the screw 24 that pushes same, which screw is threaded in the closing cap or stopper 25. Upon turning said screw, the movable contacts 26 and 27 make contact and close the circuit, while upon unscrewing said screw, the expansion spring 22 separates the contacts and opens the circuit.

I claim:

1. A portable pocket microscope, comprising:

housing means comprising first and second elongated rigid tubular elements adapted to be longitudinally and coaxially coupled together, one end of one of said tubular elements having a conical portion adapted to be disposed in telescopic relation relative to one end of said other tubular element for permitting said first and second tubular elements to be coaxially press fitted together;

eyepiece means mounted on said first tubular element adjacent the other end thereof;

illuminating means mounted in said second tubular element adjacent the other end thereof, said illuminating means including a lamp and a battery housed within said second tubular element, and spring means disposed between said lamp and said battery for normally maintaining said battery out of contact with said lamp;

end cap means removably mounted on said other end of said second tubular element for retaining said battery within said housing means;

actuator means for causing relative movement between said lamp and said battery to selectively permit energization of said lamp, said actuator means including a manually movable actuator member movably mounted on said end cap means and extending therethrough whereby movement of said actuator member causes relative movement of said battery toward said lamp for contacting and energizing same;

objective means movably mounted within one of said tubular elements and adjusting means coacting between said objective means and said one tubular element for permitting said objective means to be selectively moved axially relative to said one tubular element; and said housing means having means defining a slot transverse to the axis of said coaxial tubular elements for receiving therein an object slide, said slot being disposed axially between said objective means and said illuminating means.

2. A microscope according to claim 1, wherein said actuator member comprises a screw member threadably engaged with said end cap means and extending therethrough, the inner end of said screw member being adapted to contact said battery for moving same toward said lamp, the outer end of said screw member being adapted to be manually gripped for permitting selected rotation of said screw member for causing same to axially move relative to said housing means so as to move said battery relative to said housing means.

3. A microscope according to claim 2, wherein said eyepiece means includes a eyepiece member threadably engaged with said other end of said first tubular element, said first tubular element being provided with an interior ledge for supporting the border of a first lens forming part of said eyepiece means, a pair of separator sleeves disposed within said first tubular element between said first lens and said eyepiece member, and a diaphragm having a fixed aperture therein disposed between said pair of separator sleeves, and said eyepiece means also including a supporting gasket disposed between said eyepiece member and the adjacent end of one of said separator sleeves and a second lens disposed within and held by said gasket, said second lens being disposed directly adjacent said eyepiece member.

4. A microscope according to claim 2 wherein said objective means includes a plurality of axially spaced lens housed within a cup-shaped body having a perforated bottom, the position of said body being axially movable relative to said housing means for selectively adjusting the axial position of said objective means.

5. A microscope according to claim 2, wherein said means defining a slot transverse to the axis of said coaxial tubular elements comprises parallel, radially extending flange means integrally connected to one of said tubular elements and defining a slot therebetween for permitting a slide to be disposed transversely across said housing means, said flange means having an opening for permitting the slide to be inserted into or removed from said slot.